United States Patent
Warren

(10) Patent No.: US 10,066,618 B2
(45) Date of Patent: Sep. 4, 2018

(54) VARIABLE DISPLACEMENT COMPRESSOR WITH AN OIL CHECK VALVE

(71) Applicant: MAHLE International GmbH, Stuttgart (DE)

(72) Inventor: Matthew R. Warren, Buffalo, NY (US)

(73) Assignee: MAHLE International GmbH, Stuttgart (DE)

( * ) Notice: Subject to any disclaimer, the term of this patent is extended or adjusted under 35 U.S.C. 154(b) by 766 days.

(21) Appl. No.: 14/533,686

(22) Filed: Nov. 5, 2014

(65) Prior Publication Data

US 2016/0123321 A1    May 5, 2016

(51) Int. Cl.
| | |
|---|---|
| F04B 1/26 | (2006.01) |
| F04B 53/10 | (2006.01) |
| F16K 15/04 | (2006.01) |
| F04B 27/18 | (2006.01) |
| F04B 39/00 | (2006.01) |

(52) U.S. Cl.
CPC ...... F04B 53/1002 (2013.01); F04B 27/1804 (2013.01); F04B 39/0027 (2013.01); F04B 39/0055 (2013.01); F16K 15/044 (2013.01); F04B 2027/1813 (2013.01); F04B 2027/1872 (2013.01)

(58) Field of Classification Search
CPC ...... F04B 2027/1809; F04B 2027/1813; F04B 2027/1827; F04B 2027/1831; F04B 2027/1836; F04B 2027/1845; F04B 2027/1854; F04B 2027/1859; F04B 2027/1868; F04B 27/1804; F04B 53/1002; F04B 39/0055; F04B 39/0027; F04B 27/14–2027/1895; F16K 15/044; F16K 15/025; F16K 15/038

USPC ............ 417/222.1, 222.2, 269–272; 137/512

See application file for complete search history.

(56) References Cited

U.S. PATENT DOCUMENTS

| | | | | |
|---|---|---|---|---|
| 5,681,150 | A * | 10/1997 | Kawaguchi | F04B 27/1804 417/222.2 |
| 5,964,578 | A * | 10/1999 | Suitou | F04B 27/1804 417/222.2 |
| 6,149,397 | A * | 11/2000 | Mizutani | F04B 27/1036 417/222.2 |
| 6,241,483 | B1 * | 6/2001 | Kato | F04B 27/1804 417/222.2 |

(Continued)

FOREIGN PATENT DOCUMENTS

EP    1 852 607 A1    11/2007

*Primary Examiner* — Charles Freay
(74) *Attorney, Agent, or Firm* — Brinks Gilson & Lione

(57) ABSTRACT

A variable displacement compressor includes a control valve and a check valve. The control valve is in fluidic communication with a discharge chamber of the compressor and a crankcase of the compressor. The check valve is interposed between the control valve and the discharge chamber. The check valve is configured to allow flow from the discharge chamber to the control valve and to prevent flow from the control valve to the discharge chamber. The check valve includes a ball and a spring. The spring is configured to urge the ball toward a closed position. The spring is characterized by a rate of the spring and a free-length of the spring, and the rate and the free-length are selected to minimize de-stroke noise caused by a rapid change of the compressor operation to a low displacement state.

2 Claims, 2 Drawing Sheets

(56) References Cited

U.S. PATENT DOCUMENTS

| | | | |
|---|---|---|---|
| 6,340,293 B1* | 1/2002 | Bona | F04B 27/1804 417/222.2 |
| 6,352,416 B1 | 3/2002 | Ota et al. | |
| 6,511,297 B2* | 1/2003 | Ota | F04B 27/109 417/222.2 |
| 7,559,208 B2* | 7/2009 | Ota | F04B 27/1036 417/222.2 |
| 2002/0006337 A1* | 1/2002 | Kimura | F04B 27/1804 417/222.2 |
| 2004/0120829 A1* | 6/2004 | Pitla | F04B 27/1804 417/222.2 |
| 2005/0008499 A1* | 1/2005 | Umemura | F04B 27/1804 417/222.2 |
| 2005/0254961 A1* | 11/2005 | Kawamura | F04B 27/1804 417/222.2 |
| 2006/0242976 A1* | 11/2006 | Nakamura | B60H 1/3219 62/228.1 |
| 2009/0108221 A1* | 4/2009 | Umemura | F04B 27/1804 251/129.15 |
| 2009/0183786 A1 | 7/2009 | Iwa et al. | |
| 2011/0214564 A1* | 9/2011 | Okuda | F04B 27/1081 91/505 |

\* cited by examiner

VARIABLE DISPLACEMENT COMPRESSOR WITH AN OIL CHECK VALVE

TECHNICAL FIELD OF INVENTION

This disclosure generally relates to variable displacement compressor, and more particularly relates to a check valve configured to prevent the flow of oil from the crankcase into the discharge chamber via a control valve of the compressor.

BACKGROUND OF INVENTION

It is known to equip a variable displacement compressor for an air-conditioner system with an electronic control valve (ECV). The compressor provides various passageways so pressure in various chambers within the compressor can be sensed by the ECV for the purpose of controlling the degree of displacement of the compressor. The chambers include a suction chamber having a suction pressure (PS), a discharge chamber having a discharge pressure (PD), and a crankcase having a crankcase pressure (PC).

The crankcase typically contains oil for lubricating various moving parts within the crankcase. However, the passageways and the configuration of the ECV create a path that oil from the crankcase can flow into the discharge chamber during shipping and handling of a new (i.e. not installed in a vehicle) compressor. When the compressor is installed on a vehicle, a discharge port plug is removed so the compressor can be connected to the rest of the air-conditioner system. If oil from the crankcase has accumulated in the discharge chamber, that oil may leak out of the compressor during the installation process and undesirably deposit on the vehicle or the person installing the compressor, and undesirably reduce the amount of oil in the compressor.

SUMMARY OF THE INVENTION

In accordance with one embodiment, a variable displacement compressor is provided. The variable displacement includes a control valve and a check valve. The control valve is in fluidic communication with a discharge chamber of the compressor and a crankcase of the compressor. The check valve is interposed between the control valve and the discharge chamber. The check valve is configured to allow flow from the discharge chamber to the control valve and to prevent flow from the control valve to the discharge chamber.

In accordance with one embodiment, the check valve includes a ball and a spring. The spring is configured to urge the ball toward a closed position. The spring is characterized by a rate of the spring and a free-length of the spring, and the rate and the free length are selected to minimize de-stroke noise caused by a rapid change of the compressor operation to a low displacement state.

Further features and advantages will appear more clearly on a reading of the following detailed description of the preferred embodiment, which is given by way of non-limiting example only and with reference to the accompanying drawings.

BRIEF DESCRIPTION OF DRAWINGS

The present invention will now be described, by way of example with reference to the accompanying drawings, in which.

DETAILED DESCRIPTION

Figure 1:
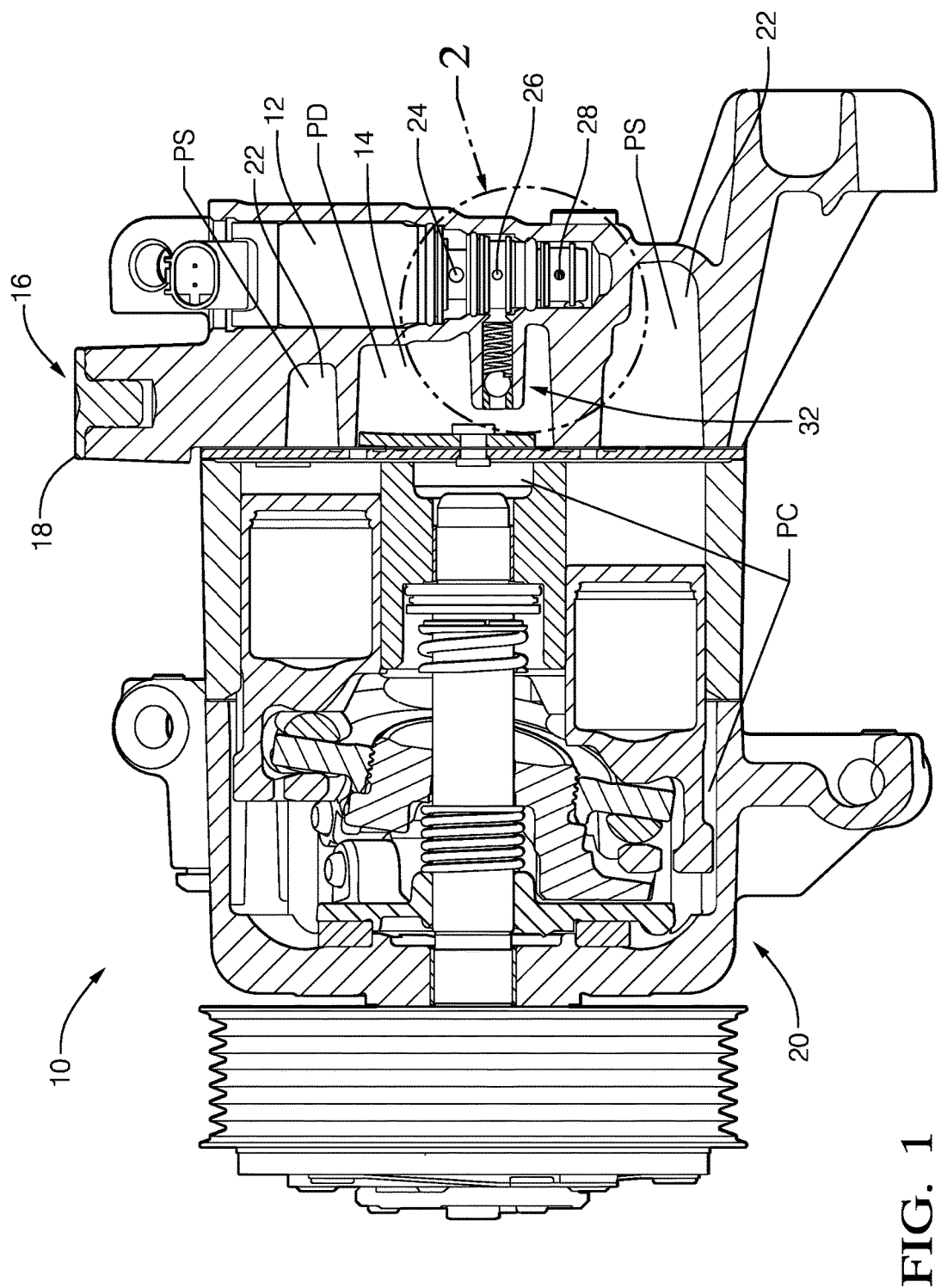
FIG. 1 is a sectional side view of a variable displacement compressor in accordance with one embodiment.
Figure 2:
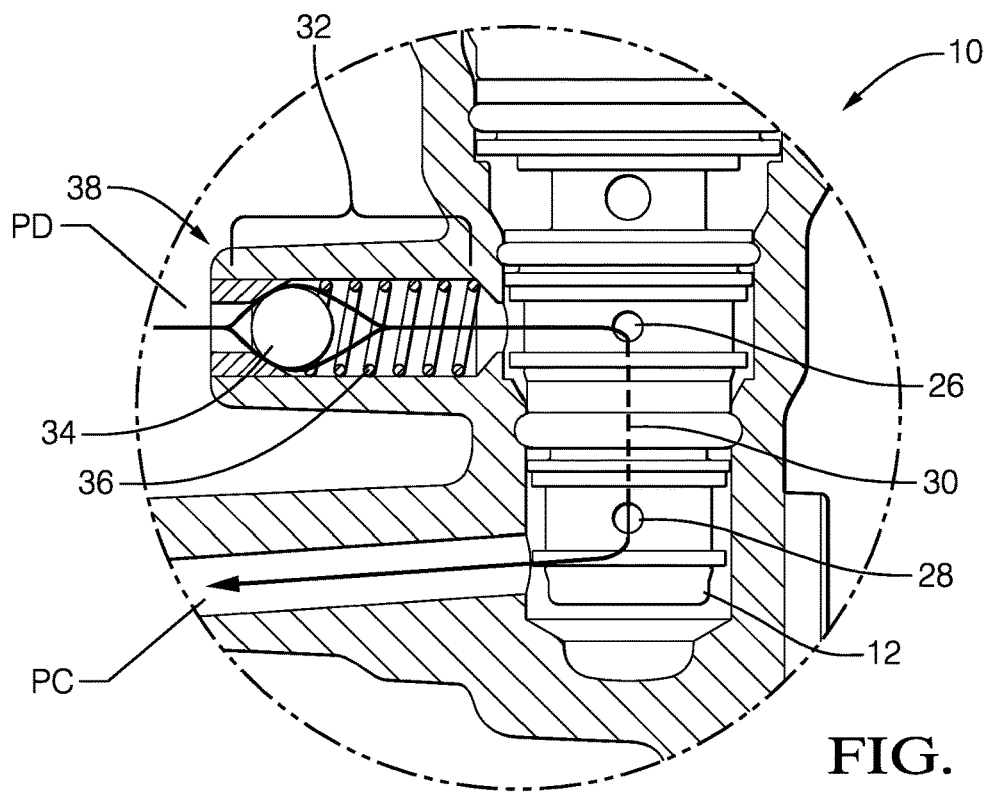
FIG. 2 is a close-up sectional side view of a check valve in the compressor of FIG. 1 in accordance with one embodiment.

FIGS. 1 and 2 illustrate a non-limiting example of a variable displacement compressor, hereafter referred to as the compressor 10. The compressor 10 includes a control valve 12 for controlling the effective displacement of the compressor 10, as will be recognized by those in the art. The control valve 12 is in fluidic communication with a discharge chamber 14 of the compressor 10. The discharge chamber 14 couples compressed refrigerant to a discharge connection 16 which is illustrated as being plugged with a shipping cap 18.

The control valve 12 is also in fluidic communication with a crankcase 20 of the compressor 10. The control valve 12 in this example controls or regulates a crankcase pressure PC in the crankcase 20 by applying varying portions of the discharge pressure PD from the discharge chamber 14, and the suction pressure PS from the suction chamber 22. As such, it expected by design that the crankcase pressure PC is less than the discharge pressure PD during normal operation. Accordingly, the control valve defines a suction port 24 that is fluidically coupled to the suction chamber 22, a discharge port 26 that is fluidically coupled to the discharge chamber 14, and a crankcase port 28 that is fluidically coupled to the crankcase 20. The control valve 12 typically has or defines a bleed path 30 (FIG. 2) between the discharge port 26 and the crankcase port. The bleed path 30 is provided as a failsafe mechanism if the control valve 12 fails to operate. It is through the bleed path 30 that oil from the crankcase can reach the discharge port 26 during shipping and handling.

When the compressor 10 is installed in a vehicle (not shown), the shipping cap 18 is removed and an appropriate connection is made with, for example, a condenser (not shown) installed in the vehicle. While the discharge connection 16 is illustrated in an upward orientation such that an accumulation of oil in the discharge chamber 14 would not seem to be a problem, some applications install the compressor 10 such that the discharge connection 16 is oriented downward. In this situation, if oil has passed through the bleed path 30 and accumulated in the discharge chamber 14, that oil in the discharge chamber 14 may undesirably drain from the compressor 10 when the shipping cap 18 is removed. While the level of oil in the compressor 10 is not illustrated, those in the art will recognize that the oil level is a design choice and is typically selected such that less than half of the crankcase 20 is filled with oil when the compressor 10 is prepared for shipping.

To prevent accumulation of oil in the discharge chamber 14, the compressor is equipped with a check valve 32 interposed between the control valve 12 and the discharge chamber 14. In general, the check valve 32 is configured to allow flow of refrigerant from the discharge chamber 14 to the control valve 12, as is expected during normal operation. However, in order to prevent accumulation of oil in the discharge chamber, the check valve 32 is configured to prevent flow of, for example, oil from the control valve 12 (i.e. the crankcase 20) to the discharge chamber 14.

FIG. 2 illustrates a non-limiting example of close-up of the check valve 32. The check valve 32 includes a ball 34, and a spring 36 configured to urge the ball 34 toward a closed position 38. When the ball 34 is in the closed position 38 as illustrated because, for example, there is no pressure difference between the discharge pressure PD and the crankcase pressure PC (i.e. the compressor 10 is not being operated), the ball 34 cooperates with the body of the check valve 32 to prevent oil in the crankcase 20 from flowing into the discharge chamber 14. This is advantageous as it prevents oil from accumulating in the discharge chamber 14 during shipping which could spill out of the compressor 10 if the shipping cap 18 was removed while the discharge connection 16 was oriented in a downward direction opposite of that illustrated in FIG. 1.

During testing of the compressor 10 equipped with the check valve 32, it was discovered that the check valve 32 provided an unexpected secondary benefit of reducing de-stroke noise created by a rapid change of the compressor operation to a low displacement state. While not subscribing to any particular theory, it is generally believed that much of the de-stroke noise is caused by the sudden rushing of refrigerant from the discharge chamber 14 to the crankcase 20 and the suction chamber 22 through the control valve 12, and/or the sudden change in position of various mechanical components within the compressor 10 related to varying the displacement of the compressor 10.

Figure 3:
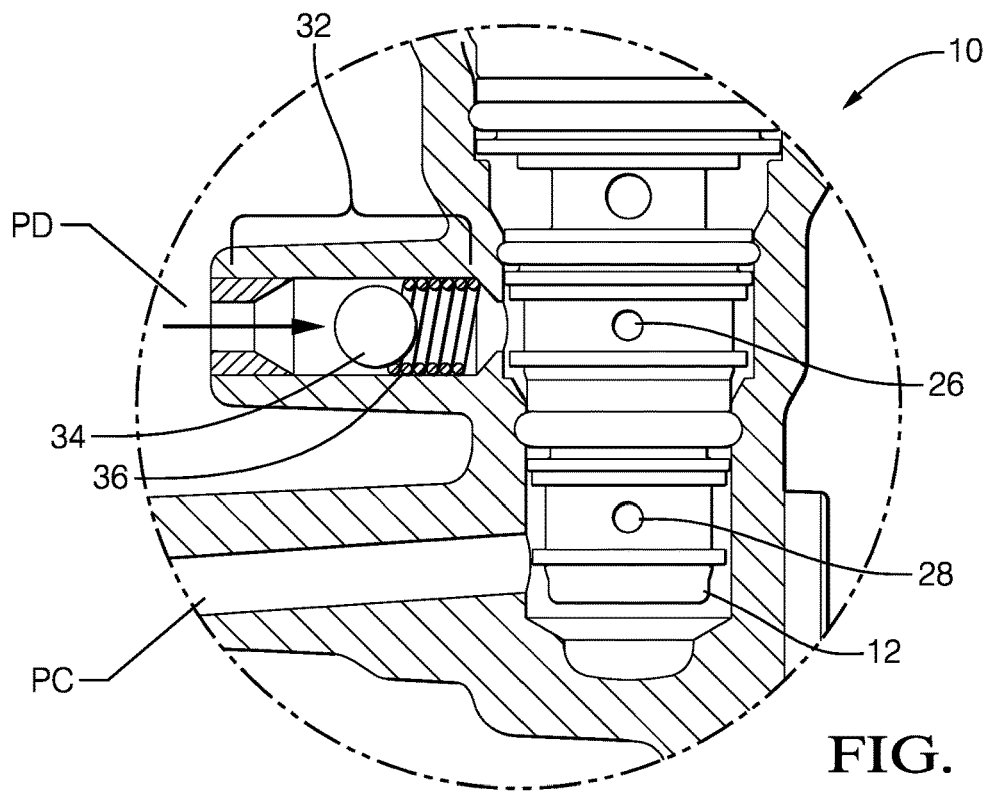
FIG. 3 is a close-up sectional side view of a check valve in the compressor of FIG. 1 in accordance with one embodiment.

Springs are characterized by a spring-rate or rate of the spring, and a free-length of the spring. Those in the art will recognize that both free-length and rate control the force that the spring 36 applies to the ball 34. It was recognized that if the rate of the spring 36 too high and/or the free-length of the spring 36 was too long, it would cause an undesirably high restriction through the check valve 32 and potentially make the response time of the compressor 10 too slow. However, if the rate is too low, and/or the free-length is too short, there is a risk of the spring 36 completely collapsing as illustrated in FIG. 3, which could also lead to an undesirably slow compressor response time to changes in displacement. As such, the rate and the free-length of the spring 36 are selected through empirical testing so that the de-stroke noise created by a rapid change of the compressor operation to a low displacement state is minimized, and so the check valve 32 does not undesirably reduce the time response characteristics when the compressor 10 varies the operational displacement of the compressor 10.

It is contemplated that the slow response time problem could be avoided at least in part by providing a small by-pass port around the check valve or around the ball/spring assembly when the spring 36 is collapsed as shown in FIG. 3. However, adding a bypass port undesirably increases manufacturing cost, so the preferred solution is to properly select the rate of the spring 36 and the size of the check valve 32.

Accordingly, a compressor 10 equipped with a check valve 32 to prevent undesirable flow of oil is provided. The check valve 32 also provides the unexpected secondary benefit of reducing de-stroke noise caused by a rapid change of the compressor operation to a low displacement state.

While this invention has been described in terms of the preferred embodiments thereof, it is not intended to be so limited, but rather only to the extent set forth in the claims that follow.

I claim:

1. A variable displacement compressor comprising:
   a control valve in fluidic communication with a discharge chamber of the compressor and a crankcase of the compressor; and
   a check valve interposed between the control valve and the discharge chamber, said check valve configured to allow flow from the discharge chamber to the control valve and to prevent flow from the control valve to the discharge chamber.

2. The compressor in accordance with claim 1, wherein the check valve includes a ball, and a spring configured to urge the ball toward a closed position.

* * * * *